United States Patent [19]

Merhav et al.

[11] Patent Number: 5,520,359
[45] Date of Patent: May 28, 1996

[54] SPACECRAFT WITH GRADUAL ACCELERATION OF SOLAR PANELS

[75] Inventors: Tamir R. Merhav, Freehold, N.J.; Michael T. Festa, Yardley; John B. Stetson, Jr., New Hope, both of Pa.

[73] Assignee: Martin Marietta Corporation, East Windsor, N.J.

[21] Appl. No.: 236,301

[22] Filed: May 2, 1994

[51] Int. Cl.$^6$ .................................................. B64G 1/44
[52] U.S. Cl. ...................... 244/158 R; 244/173; 318/696
[58] Field of Search .......................... 244/158 R, 173, 244/170; 318/696, 254, 439, 685; 136/291

[56] References Cited

U.S. PATENT DOCUMENTS

| | | | |
|---|---|---|---|
| 4,250,435 | 2/1981 | Alley et al. | 318/696 |
| 4,648,026 | 3/1987 | Petrick | 318/696 |
| 4,692,674 | 9/1987 | Packard et al. | 318/696 |
| 4,843,294 | 6/1989 | Bhat et al. | 244/170 |
| 5,216,345 | 6/1993 | Eyerly | 318/696 |

Primary Examiner—Galen L. Barefoot
Attorney, Agent, or Firm—W. H. Meise; C. A. Berard; S. A. Young

[57] ABSTRACT

A spacecraft (8) includes a movable appendage such as solar panels (12) operated by a stepping motor (28) driven by pulses (311). In order to reduce vibration and/or attitude error, the drive pulses are generated by a clock down-counter (312) with variable count ratio. Predetermined desired clock ratios are stored in selectable memories (314a–d), and the selected ratio (R) is coupled to a comparator (330) together with the current ratio (C). An up-down counter (340) establishes the current count-down ratio by counting toward the desired ratio under the control of the comparator; thus, a step change of solar panel speed never occurs. When a direction change is commanded, a flag signal generator (350) disables the selectable memories, and enables a further store (360), which generates a count ratio representing a very slow solar panel rotational rate, so that the rotational rate always slows to a low value before direction is changed. The principles of the invention are applicable to any movable appendage.

3 Claims, 2 Drawing Sheets

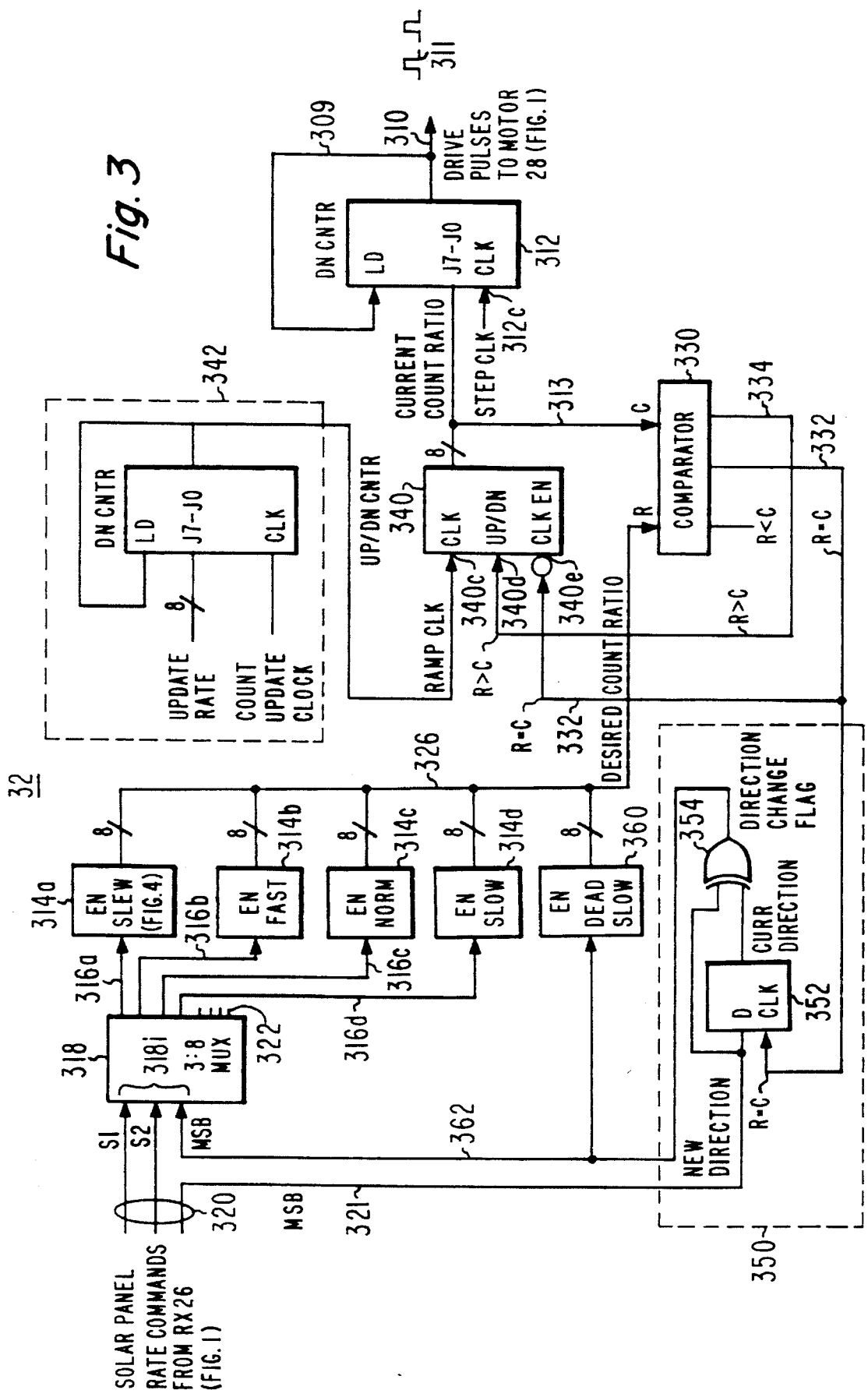

SPACECRAFT WITH GRADUAL ACCELERATION OF SOLAR PANELS

STATEMENT OF GOVERNMENT RIGHTS

The Government has rights in this invention pursuant to contract NAS 5-30350 with NASA.

FIELD OF THE INVENTION

This invention relates to spacecraft with movable appendages, such as solar panels for generating electricity for the spacecraft, and more particularly to such spacecraft in which the rotational rate of the appendages or solar panel(s) relative to the body is constrained to gradual acceleration and deceleration.

BACKGROUND OF THE INVENTION

Spacecraft often use one or more solar panels, referred to in the plural hereinafter, to generate electricity for operation of electrical portions of the spacecraft. Systems depending upon electrical power include communication systems, payload, attitude control systems, and propulsion systems. The orbit of a spacecraft may be such as to require the solar panels to rotate relative to the body of the spacecraft, in order to track the sun. The position of the panels may need to be adjusted after an attitude or other control maneuver, so it is convenient to be able to move the panels in "forward" and "reverse" rotational directions at various speeds. Also, the position of the panels may have to be changed continuously during normal operation of the spacecraft, as the orbital position of the spacecraft relative to the sun changes.

When an adjustment of the position of the solar panels is required, a motor is energized, or the rotation rate of a motor is changed, to drive the panels relative to the body of the spacecraft. The motion or change of constant motion may cause unwanted vibrations of portions of the spacecraft to occur, and it also results in a tendency to change the attitude of the body of the spacecraft, which tendency may be corrected by an attitude control system, if one is provided. The vibrations may be damped by an actuator coupled to sense the vibration motion, as described, for example, in allowed U.S. patent application Ser. No. 08/031,252, filed Mar. 12, 1993 in the name of Stetson. While movable solar panels are described, any movable appendage tends to cause vibration and attitude error.

A simplified vibration or attitude error suppression arrangement for use in conjunction with solar panels and other movable appendages is desired.

SUMMARY OF THE INVENTION

A spacecraft includes a body, and at least one solar panel rotationally connected to the body for generating electric power when insolated. In general, the invention tends to minimize jitter and jerk effects imposed on the spacecraft body as a result of sudden changes in rotational rate and/or direction. In general, the drive rate of solar panels according to the invention is changed slowly, so that the jerk (the time derivative or rate of change of the acceleration) is minimized, and so that the acceleration produces a torque on the spacecraft body which is within the bandwidth of the attitude control system. In a one embodiment of the invention, a pulse-operated drive arrangement is coupled to the body and to the solar panel, for rotating the solar panel relative to the body by an incremental angle in response to each drive pulse of a sequence of drive pulses. In a particular embodiment of the invention, the drive arrangement includes a stepper motor. A count-down arrangement is coupled to the pulse operated drive arrangement and to a source of first clock signals. The count-down arrangement includes a current count ratio signal input port at which it receives signals representing the current count ratio (where the word "current" refers to a time relationship rather than to the flow of electricity). The count-down arrangement counts the first clock signals modulo the current count ratio, and generates each of the drive pulses for the drive arrangement in response to the count of the count-down arrangement. The count-down arrangement, upon generating a drive pulse, is loaded anew with the current count ratio, which may be the same as the previous count ratio, or different. A larger current count ratio results in counting of a larger number of the first clock signals, and thereby increases the time interval between the drive pulses, which in turn slows the rotational rate of the solar panel. A source provides signals representing a selected one of a predetermined number of solar panel rotational rates; the source may be, for example, commands up-linked to the spacecraft. The spacecraft also includes a number, equal to the predetermined number, of read-only digital memories, each of which read-only memories is preloaded with information in the form of a digital count ratio corresponding to a different one of the solar panel rotational rates, and each of the read-only memories is coupled to the source of signals for being enabled or disabled thereby, in such a manner that only one of the digital memories is enabled at any one time. The spacecraft also includes a source of ramp clock signals, which may be the same as the first clock signals, and a controllable up-down counting arrangement with a clock input port coupled to the source of ramp clock signals. The up-down counting arrangement also includes an enable input port and a count direction input port. The up-down counting arrangement (a) generates the current count ratio signal, and applies it to the count-down arrangement; the current count ratio signal is representative of the current count of the up-down counting arrangement. The up-down counting arrangement also (b) is enabled for counting the ramp clock signals in response to a second logic characteristic of a digital enable signal applied to the enable input port, and disables the counting arrangement in response to a first logic characteristic of the enable signal applied to the enable input port, and (c) is configured for counting up in response to a first logic characteristic of a digital count direction signal applied to the count direction input port. In a particular embodiment of the invention, the first logic characteristic is a logic 1 or logic high level, and the second logic characteristic is a logic 0 or logic low condition. A comparator arrangement is coupled to the read-only digital memories and to the up-down counting arrangement, for comparing the current count ratio signal from the output of the up-down counting arrangement with the digital count ratio from the currently active digital memory. The comparator arrangement generates the digital enable signal and couples it to the enable input port of the up-down counting arrangement. The digital enable signal indicates by a first logic characteristic that the current count ratio signal equals the currently active digital count ratio, and by a second logic characteristic that the current count ratio signal is unequal to the currently active digital count ratio. The comparator arrangement also generates the digital count direction signal and couples it to the count direction input port of the up-down counting arrangement. The digital count direction signal indicates by a first logic characteristic that the digital count ratio signal exceeds the current count ratio signal, and by a second logic characteristic that the digital count ratio signal does not exceed the current count ratio signal. When the digital count ratio signal applied to the comparator arrangement represents a small number, indicative of a command for rapid rotation of the solar panel, and the current count signal is a larger number, representing slower rotation of the solar panel, the comparator (a) generates the digital enable signal with the second logic characteristic, whereby the up-down counting arrangement is enabled for counting, and (b) generates the count direction signal with the second logic characteristic, for thereby enabling the up-down counting arrangement for counting down, so that the current count ratio signal approaches the digital count ratio signal, and the rate of rotation of the solar panel gradually accelerates. When the digital count ratio signal applied to the comparator arrangement represents a large number, indicative of a command for slow rotation of the solar panel, and the current count signal is a smaller number, representing faster actual rotation of the solar panel, the comparator (c) generates the digital enable signal with the second logic characteristic, whereby the up-down counting arrangement is enabled for counting, and (d) generates the count direction signal with the first logic characteristic, for thereby enabling the up-down counting arrangement for counting up, so that the current count ratio signal approaches the digital count ratio signal, and the rate of rotation of the solar panel decelerates, and when the current count ratio signal equals the digital count ratio signal, the digital enable signal is set to the first logic characteristic, thereby disabling the up-down counting arrangement from counting, so that the rotational rate remains at the rate represented by the selected one of the digital count ratios.

In another embodiment of the invention, the source of signals representing a selected one of a predetermined number of solar panel rotational rates includes a one-of-many or a one-of-N demultiplexing or decoding arrangement coupled to the source of, which in this case are digital signals representative of a selected one of a predetermined number of solar panel rotational rates. The one-of-many demultiplexing arrangement decodes the digital signals, and applies an enabling signal to the selected one of the read-only digital memories. According to an aspect of the invention, the less significant digits of the one-of-many demultiplexing arrangement are coupled to a source of digital signals representative of a selected one of a predetermined number of solar panel rotational rates, and a most significant digit responds to a direction change flag signal. The one-of-many demultiplexing arrangement decodes the digital signals, and applies an enabling signal to the selected one of the read-only digital memories when the direction change flag signal assumes a second logic characteristic. A direction flag signal generating arrangement is coupled to the one-of-many demultiplexing arrangement, for generating a direction flag signal when the desired direction of rotation of the solar panel is reversed, and for maintaining the direction flag signal until the digital enable signal from the comparator arrangement indicates that the speed of rotation of the solar panel equals the desired speed. A digital read-only information storage arrangement is coupled to the comparison arrangement, and is preloaded with information in the form of a further digital count ratio signal, which corresponds to a solar panel rotational rate slower than any of the rotational rates associated with the information preloaded into the digital read-only memories. The digital read-only information storage arrangement includes an enable input port responsive to a first logic characteristic of the direction flag signal applied thereto. A coupling arrangement is coupled to the direction flag signal generating arrangement, to the enable input port of the digital read-only information storage arrangement, and to the most significant bit of the digital input port of the one-of-many demultiplexing arrangement, for coupling the direction flag signal to the one-of-many demultiplexing arrangement and to the digital read-only information storage arrangement, for, in response to a command to change direction, causing the one-of-many demultiplexing arrangement to disable the read-only digital memories, and for enabling the digital read-only information storage arrangement, whereby the digital read-only information storage arrangement produces the further digital count ratio signal corresponding to a solar panel rotational rate slower than any of the rotational rates associated with the information preloaded into the digital read-only memories. The comparator arrangement causes the up-down counting arrangement to count up, as a result of which the current count ratio signal approaches the further digital count ratio signal, and the comparator causes the digital enable signal to assume the first logic state when the current count ratio signal equals the further digital count ratio signal, whereby the direction flag signal generating arrangement ceases generation of the direction flag signal, the digital read-only information storage arrangement is disabled, and the one-of-many demultiplexing arrangement enables one of the read-only digital memories.

DESCRIPTION OF THE DRAWINGS

FIG. 3 is a simplified block diagram of a portion of solar panel position controller 32 of FIG. 1;

DESCRIPTION OF THE INVENTION

Figure 1:
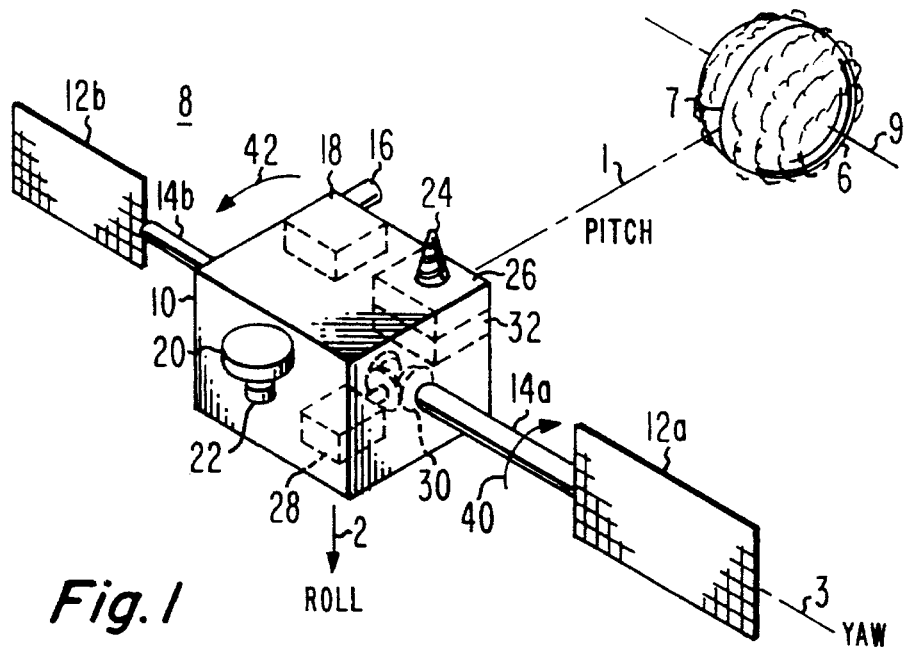
FIG. 1 is a simplified perspective or isometric view of a spacecraft according to the invention, including solar panels, solar panel motors and drives therefor, and also including an attitude control system and a solar panel position controller.

In FIG. 1, a spacecraft 8 includes a body 10 and solar panels 12a and 12b, coupled to, or supported by body 10 by means of elongated support elements 14a and 14b, respectively, which may be, for example, shafts. Spacecraft 8 orbits along an equatorial path 7 which girdles the Earth 6 equidistant from axis of rotation 9. A pitch axis 1 extends between Earth and the center of mass of spacecraft 8, a roll axis 2 extends in the direction of motion, and a yaw axis 3 extends at right angles to the pitch and roll axes, roughly parallel to axis 9. Support elements 14a and 14b extend parallel to the yaw axis, and are rotatably affixed to body 10, so that the solar panels 12a and 12b may be directed toward the sun as the spacecraft orbits.

Spacecraft 8 also includes an Earth sensor 16 for sensing roll and pitch, and an attitude controller 18, for generating attitude control signals in at least roll and pitch, and preferably also in yaw. As is well known to those skilled in the art, yaw is difficult to measure directly, and many schemes are known for determining yaw, such as, for example, sun sensors. Attitude controller 18 is coupled to an appropriate yaw sensor (not illustrated), or it may use a yaw estimator, such as that described, for example, in U.S. Pat. No. 5,205,518, issued Apr. 27, 1993, in the name of Stetson. In whatever manner, attitude controller 18 generates pitch, roll and yaw control signals, which are applied (by means, not illustrated) to torquers for the appropriate axes, which are represented in FIG. 1 by a momentum or reaction wheel 20 associated with a driver 22.

FIG. 1 also illustrates an "omnidirectional" antenna of the bifilar conical equiangular helix type, for receiving commands from an Earth station, and for coupling them to a transceiver 26, and for transmitting status information therefrom.

An electrically driven motor arrangement 28 is mechanically coupled by a coupling 30 to rotational shafts or supports 14a and 14b, for creating relative motion between spacecraft body 10 and solar panels 12a and 12b, under control of signals generated by a solar panel position controller 32. Controller 32 receives instructions as to the desired rotational rate of the solar panels from receiver 26, and generates the appropriate signals for controlling motor arrangement 28. Details of solar panel position controller 32 appear below in conjunction with FIGS. 3 and 4. In a specific embodiment of the invention, motor arrangement 28 is a stepping motor arrangement, which responds to each of a sequence of electrical drive pulse applied thereto from position controller 32, for incrementing the rotational position of supports or shafts 14a and 14b, for correspondingly positioning solar panels 12a and 12b. In general, the direction of the drive imparted to the solar panels is not a part of the invention, and drive in two opposite rotational directions may be accomplished by directing the drive pulses to one of two oppositely-connected stepping motors, or by using a solenoid-operated mechanism to change the direction of rotation occasioned by operation of a single motor.

Figure 2:
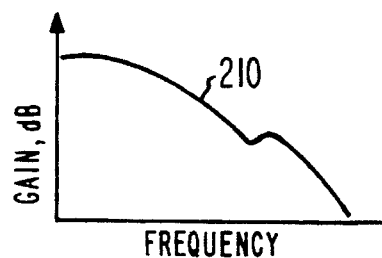
FIG. 2 is a gain-versus-frequency plot representing the response about a control axis of the attitude control system of the arrangement of FIG. 1.

Motion of the solar panels affects the attitude of the spacecraft body. In particular, rotation of the panels in a particular direction, such as that illustrated by arrow 40 in FIG. 1, results in an oppositely-directed rotation of body 10, namely in the direction of arrow 42. FIG. 2 illustrates the magnitude component of a "Bode" plot 210, illustrating the relationship of attitude control loop gain in dB as a function of frequency. As illustrated, the gain decreases with increasing frequency, which means that those perturbations of the attitude which have high-frequency components receive less correction from the attitude control system than do perturbations having lower-frequency components. In order to reduce the magnitude of body attitude disturbances having high frequency components, it is desirable to reduce the magnitude of the jerk (the derivative or rate of change of acceleration) of the moving solar panels.

FIG. 3 is a simplified block diagram of a portion of solar panel position controller 32 of FIG. 1. In FIG. 3, the drive pulses 311 which are applied to stepper motor 28 of FIG. 1 are generated on an output signal path 310 by a count-down counter (DN CNTR) 312 at the right of FIG. 3. The drive pulses 311 produced on path 310 may be applied to an amplifier (not illustrated) if necessary, before being applied to the stepper motor. Down-counter 312 counts step clock pulses applied to its clock (CLK) input port 312c, with a modulo established by eight-bit current count ratio signals applied over an eight-bit bus 313 to its J0–J7 input terminals (where the word "current" refers to a time relationship rather than to the flow of electricity), and produces an output pulse on path 310 each time the counter reaches zero count. Down-counter 312 is reset to the commanded count at each output pulse by a feedback path 309 extending from output signal path 310 to the LD input terminal, and, once reset, continues to count clock pulses according to the current count ratio. The rotation rate of the solar panels depends upon the rate of operation of the stepper motor 28. Since the stepper motor which drives the solar panels moves by one increment in response to each drive pulse 311 from down-counter 312, and the step clock frequency is constant, the frequency or recurrence rate of the counted-down pulses depends upon the current count ratio signal applied to the down-counter. If the current count ratio signal represents a large number, for example the number 255 for an all-ones eight-bit signal, only one output pulse occurs for every 255 step clock pulses, and as a result a large current count ratio signal represents a slow rotation rate of the solar panels. Conversely, when the current count ratio signal is small, representing, for example, the decimal number three, an output pulse occurs for every three step clock pulses, corresponding to a rapid rotational rate of the solar panels.

Figure 4:
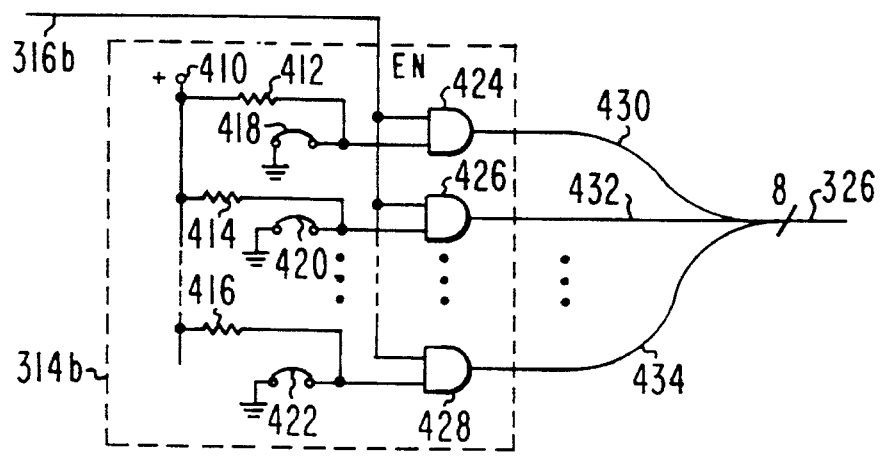
FIG. 4 is a simplified block and schematic diagram of a digital memory of the arrangement of FIG. 3.

The count ratio signals which control the solar panel rotation rate originate in a set of controllable digital memories 314a, 314b, 314c, and 314d of FIG. 3, each of which is preprogrammed with a particular eight-bit count-down number, representing the desired rotational rate of the solar panels. FIG. 4 illustrates details of one possible embodiment of memory 314a. Memory 314a is programmed with a relatively small number, for a "slew" operational mode, by which the solar panels are rapidly moved toward a new position. Digital memories 314b, 314c, and 314d are marked "fast," "normal," and "slow," respectively, representing storage therein of corresponding count-down ratios. The "normal" speed signal stored in digital memory 314c corresponds to a rotational velocity of the solar panels which is selected to exactly track the sun when the spacecraft is in normal orbit, such as a geosynchronous orbit. Each memory 314a–314d, where the hyphen represents the word "through", also includes an enable (EN) input terminal. The enable input terminals of memories 314a–314d are coupled by individual signal paths 316a–316d, respectively, to a one-of-many decoder or demultiplexer 318. A one-of-many decoder is also known as a one-of-N decoder. Decoder 318 is a one-of-eight decoder in one embodiment of the invention.

One-of-many decoder 318 of FIG. 3 receives two-bit digital commands from receiver 26 of FIG. 1 at the two least-significant bits (LSB) of a three-bit input port 318i by way of the two least-significant bits of a three-bit bus 320. The two-bit digital signal applied over the two least-significant bits of bus 320 to the two least significant bits of input port 318i represents one of the four solar panel rotational "speeds" stored in digital memories 314a–314d. The two-bit digital signal applied to the two least-significant bits of input port 318i is decoded by decoder 318 to one of two output "pages", depending upon the state of the most-significant bit (MSB) applied to input port 318i. When the MSB applied to input port 318i of decoder 318 is a logic zero or logic low level, the decoded output appears on one path of a four-path page consisting of output paths 314a, 314b, 314c, and 314d. When the MSB applied to input port 318i is a logic 1 or logic high level, decoder 318 decodes the signal to one path of a four-path page consisting of four unconnected output signal paths, one of which is designated 322. Thus, when the MSB at input port 318i is a logic 0, decoder 318 decodes the two least significant bits to a signal path 316, thereby enabling a corresponding one of the digital memories 314, and when the MSB is a logic 1, decoder 318 decodes the two least significant bits to an unused signal path 322, which effectively disables digital memories 314a–314d.

The eight-bit output signal from the enabled one of digital memories 314a–314d of FIG. 3 is the desired count ratio signal, which is coupled by an eight-bit bus 326 to a first (R) input port of a comparator 330, and the current count ratio signal applied to down-counter 312 is also applied to a second (C) input port of comparator 330. Comparator 330 compares the eight-bit desired count ratio signal applied to its R input port with the eight-bit current count ratio signal applied to its C input port, and, depending upon the comparative values of the signals, produces various states of three different one-bit output logic signals, namely R=C, which is produced on a path 332, R>C, which is produced on a signal path 334, and R<C, which is not used.

An up-down counter (UP/DN CNTR) 340 in FIG. 3 receives "ramp" clock signals at its clock (CLK) input port 340c from a "ramp" clock signal generator designated generally as 342. While the term "ramp" is used to describe the clock signals, they are simple clock signals, so termed because they are used in the up-down counter for ramping the count value up and down. The ramp clock frequency may be equal to the step clock frequency, or it may be different. Up-down (UP/DN) counter 340 also receives the R>C signal at its up-down direction input port 340d from signal path 334, for control of the counting direction, as described below. Up-down counter 340, when enabled, counts down in response to a logic low level applied to its UP/DN input port, and counts up in response to a logic high level. An inverting enable input (CLK EN) terminal 340e of up-down counter 340 receives the R=C signal from signal path 332.

In operation of the arrangement of FIG. 3 as so far described, rotation of the solar panels occurs continuously, under the control of down-counter 312 as influenced by the current count ratio applied thereto, as described above. After the control system of FIG. 3 has had sufficient time to stabilize, the current count ratio signal applied over bus 313 to down-counter 312, for directly controlling the stepper motor rate, and also applied to comparator 330, will equal the desired count ratio signal applied over bus 326 to comparator 330. Under this steady-state condition, the signal produced by comparator 330 on R=C path 332 will be true or logic high, and the signal on R>C path 334 will be false or logic low. The logic high R=C signal produced on path 332 by comparator 330 is inverted at the inverting enable input port 340e of up-down counter 340, and disables the counter from counting. Consequently, up-down counter 340 does not count, and the current count ratio signal generated at the output of up-down counter 340 does not change, and remains equal to the desired count ratio generated on bus 326. Since the current count ratio signal generated by up-down counter 340 controls the count-down in downcounter 312, the count-down ratio remains unchanged, the drive pulses continue to be generated at a constant rate, and the solar panel rotation rate remains constant.

Suppose that the constant rotational rate described above is the "normal" rate commanded by the digital signal produced by digital memory 314c of FIG. 3. In that case, commands could be applied over bus 320 to increase the rotational rate to either the "fast" rate or the still faster "slew" rate, or a command could be given to slow to the "slow" rate commanded by digital memory 314d. The first possibility, namely that of commanding an increased rotational rate, is considered first. A command is transmitted from an Earth station, intercepted by antenna 24 of FIG. 1, demodulated and otherwise processed by receiver 26, and transmitted to solar panel controller 32 of FIG. 3 by way of bus 320. The increased rate is decoded by decoder 318, and an enable signal is decoupled from digital memory 314c and applied instead over a path 316b to either "fast" digital memory 314b or "slew" digital memory 314a. Assuming that memory 314b is enabled, memory 314b is preprogrammed with a digital number representing a faster solar panel rotation rate, which is a smaller number than that stored in "normal" rate digital memory 314c. The smaller desired count ratio number is applied over bus 326 to the R input port of comparator 330. At the instant that the change in speed is commanded, the rates of the R and C inputs to comparator 330 become different, and more particularly, R becomes smaller than or less than C. Comparator 330 responds by setting the R=C signal on path 332 to a logic low level, and the R>C signal on path 334 continues to be false or logic low. The application of the logic low signal to the UP/DN count direction input port of up-down counter 340 configures the counter for counting down, as mentioned above. The logic low level applied to the CLK EN input port 340c of up-down counter 340 is inverted at the input, and enables the counter for counting ramp clock pulses applied to input port 340c. Up-down counter 340 gradually decrements at the ramp clock rate, until its output current count signal (C) represents the same value as the desired count ratio signal (R). When the R and C values at the inputs of comparator 330 are equal, comparator sets its R=C output on path 332 to a logic high level, which disables up-down counter 340. The R>C signal produced on signal path 334 by comparator 330 does not change from the logic low state, but has no effect since up-down counter 340 is disabled. The above description holds whether the "slew" rate of digital memory 314a or the "fast" rate of digital memory 314b is selected.

Suppose that the constant rotational rate to which the control system has stabilized is, as mentioned above, the "normal" rate commanded by the digital signal produced by digital memory 314c of FIG. 3, but instead of commands applied over bus 320 to increase the rotational rate, commands are instead given to decrease the rotational rate of the solar panels to the "slow" rate. Assuming that memory 314d is enabled, memory 314d is preprogrammed with a digital number representing a slower solar panel rotation rate, which is a larger number than that stored in "normal" rate digital memory 314c. The larger desired count ratio number is applied over bus 326 to the R input port of comparator 330. At the instant that the change in speed is commanded, the rates of the R and C inputs to comparator 330 become different, and more particularly, R becomes larger than or greater than C. Comparator 330 responds by setting the R=C signal on path 332 to a logic low level, and the R>C signal on path 334 changes to be true or logic high. The application of the logic high signal to the UP/DN count direction input port of up-down counter 340 configures the counter for counting up, as mentioned above. The logic low level applied to the CLK EN input port 340c of up-down counter 340 is inverted at the input, and enables the counter for counting ramp clock pulses applied to input port 340c. Up-down counter 340 gradually increments at the ramp clock rate, until its output current count signal (C) represents the same value as the new "slow" desired count ratio signal (R). When the R and C values at the inputs of comparator 330 are equal, comparator sets its R=C output on path 332 to a logic high level, which disables up-down counter 340. The R>C signal produced on signal path 334 by comparator 330 changes from the logic high to the logic low state, but this has no effect since up-down counter 340 is disabled.

Another portion of the arrangement of FIG. 3 is used to guarantee a slow solar panel rotational rate before a change in the direction of rotation. In FIG. 3, a direction change flag signal generator designated 350 includes a D type flip-flop (ff) 352, which couples to its output port the signal on its input or D port when the clock input signal makes a negative-to-positive transition. The D input port of D ff 352 is coupled by a signal path 321 to receive the MSB of the commands received by controller 32 of FIG. 3 over bus 320. An exclusive-or (XOR) gate 354 has one input port coupled to the D input of D ff 352, for receiving the MSB in parallel therewith, and has the other input port coupled to the output of D ff 352. An XOR gate produces a logic high output when its inputs are unequal, and a logic low output when its inputs are equal. In general, the arrangement of flag generator 350 produces a logic low output under normal conditions, after the control system as a whole has stabilized, but produces a logic high output from the time a direction change command is received over signal path 321 until a later time at which the system has again stabilized.

The output port of XOR gate 354 of flag generator 350 of FIG. 3 is coupled to the MSB input terminal of digital input port 318i of decoder 318 and to the enable input port of a further read-only memory 360, termed a read-only store herein to avoid confusion with memories 314a–314d. Store 360 has stored therein a digital word representing a desired count-down ratio, selected to provide a lower solar panel rotational speed than any of the other speeds, and sufficiently low so that changing the direction of rotation causes a minimal jerk. Such a speed can be termed "dead slow". A suitable value for an eight-bit output might be 11111111, the digital value corresponding to the decimal number 255. The output port of store 360 is coupled by way of bus 326 in parallel with the outputs of digital memories 314a–314d, so that, when store 360 is enabled, its output signal is applied to the R input port of comparator 330.

In operation of the arrangement of FIG. 3, the current commanded direction of rotation is represented by the logic level applied to controller 32 over the MSB of bus 320. As mentioned, under this condition, the output from XOR 354 on signal path 362 is a logic low, which means that both input ports of XOR 354 have the same logic value. The logic low on signal path 362 disables store 360, and enables decoder 318 to select among the first page of outputs, namely the page including signal paths 316a–316d. When the system is stable, R=C, and the output of comparator 330 on signal path 332 is a logic high. A change of commanded direction occurs when the logic level on signal path 321 changes. This change has the immediate result of making the logic levels at the inputs of XOR 354 unequal, and XOR 354 as a result produces a logic high level on signal path 362. The logic high level on signal path 362 (a) switches the MSB applied to input port 318i of decoder 318, causing it to select one of the unused output paths 322, thereby disabling digital read-only memories 314a–314d, and (b) enables "dead slow" digital store 360, which produces the 11111111 signal on bus 326 and at the R input of comparator 330. Since the dead slow count ratio signal has a higher numerical value than any of the other values, the R>C output of comparator 330 on signal path 334 goes to a true or logic high condition, and R=C on signal path 332 becomes false or logic low. The logic low signal on path 332 is inverted at the CLK EN input port of up-down counter 340, and enables the counter, while the logic high condition on signal path 334 conditions up-down counter 340 for counting up. Up-down counter 340 thereafter gradually counts up toward 11111111, thereby gradually slowing the drive pulses 311 applied to the solar panel drive motor. Eventually, the count of up-down counter 340 will reach 11111111, corresponding to the slowest solar panel rotational rate. At that time, comparator 330 will set the R=C logic level on signal path 332 to a true or logic high level, disabling up-down counter 340. The transition from logic low to logic high level on signal path 332 is also applied to the CLK input port of D ff 352, causing the logic level on signal path 321, representing the new direction of rotation, to be coupled to the output of D ff 352 and to input terminal $354_2$ of XOR 354. When the logic level at the D input of D ff 352 is coupled to its output, the logic levels at both input terminals $354_1$ and $354_2$ become equal, and the output of EXOR 354 goes to a logic low level. The logic low level at the output of EXOR 354 disables "dead slow" digital store 360, and causes decoder 318 to decode the less significant bits of bus 320 to one of digital read-only memories 314a–314d, to again select a speed in the new direction. At this time, the operation reverts to a mode similar to that described above for the condition of the commanded speed being greater than the actual speed.

In FIG. 3, "ramp" clock signal source 342 is illustrated as being a count-down circuit including a down-counter 370, which receives a user-selected eight-bit update rate count-down control signal at its J0–J7 input port, and which operates much like count-down circuit 312.

FIG. 4 illustrates details of a possible embodiment of a digital memory or digital store of FIG. 3. For definiteness, digital memory 314b is illustrated. Memory 314b includes a source 410 of voltage corresponding to the logic high level, which is coupled to one end of a plurality of current limiting resistors 412, 414, . . . , and 416. Each current limiting resistor 412,414, . . . , and 416 is connected to the lower input port of a corresponding AND gate 424, 426, . . . , and 428 and by way of a detachable jumper wire 418, 420, . . . , and 422 to ground. Enable signal path 316b is connected in common to the upper input ports of tri-state gates 424, 426, . . . , and 428, for enabling the gates simultaneously, for coupling the logic levels at their lower input ports to bus 326 by way of bit paths 430, 432, . . . , and 434. The value of any bit can be selected to be a logic high by cutting the corresponding jumper, or to be logic low by not cutting the jumper. A number of tri-state gates and buffers may be provided in one microchip.

Thus, in summary, a spacecraft (8) according to the invention includes a body (10) and one or more movable appendages such as solar panels (12) operated by a stepping motor (28) driven by pulses (311). In order to reduce vibration andor attitude error, the drive pulses are generated by a down-counter (312) which counts a clock with variable count ratio. Predetermined desired clock ratios are stored in selectable memories (314a–d), and the selected count-down ratio (R) is coupled to a comparator (330) together with the current ratio count-down ratio (C). An up-down counter (340) establishes the current count-down ratio by counting toward the desired ratio under the control of the comparator; thus, a step change of solar panel speed never occurs. When a direction change is commanded, a flag signal generator (350) disables the selectable memories, and enables a further store (360), which generates a count ratio representing a very slow solar panel rotational rate, so that the rotational rate always slows to a low value before direction is changed.

Other embodiments of the invention will be apparent to those skilled in the art. For example, where the up-down counter of FIG. 3 is responsive to logic high and logic low levels of single-bit digital signals applied to its control input ports, the control input ports could also be multibit ports, and the logic characteristic could be a particular pattern of bits. The principles of the invention are applicable to any movable appendage, and not just to solar panels, and are further applicable to linear motion as well as rotary motion. While the invention as described is driven by a pulse-operated motor, those skilled in the art will recognize that the drive pulses (311) can be applied to an integrator to form a direct voltage or current for driving a motor responsive to direct voltage or current, respectively. The logic operations have been described with positive-logic conventions, but negative-logic conventions may also be used.

What is claimed is:

1. A spacecraft, comprising:

a body (10);

at least one solar panel (12) rotationally connected to said body for generating electric power when insolated;

pulse-operated drive means (28) coupled (30) to said body (10) and to said solar panel (12), for rotating said solar panel relative to said body by an incremental angle in response to each drive pulse (311) of a sequence of drive pulses;

count-down means (312) coupled to said pulse operated drive means (28) and to a source of first clock signals (312*c*), said count-down means (312) also including a current count ratio signals input port (J0–J7), for counting said first clock signals modulo said current count, and for generating each of said drive pulses (311) in response to the count of said count-down means (312), whereby a larger current count counts a larger number of said first clock signals and thereby increases the time interval between said drive pulses and slows the rotational rate of said solar panel;

a source of signals (316, 318, and 320) representing a selected one of a predetermined number of solar panel rotational rates;

a number, equal to said predetermined number, of read-only digital memories (314*a*, 314*b*, 314*c*, and 314*d*), each of said read-only memories being preloaded with information in the form of a digital count ratio signals corresponding to a different one of said solar panel rotational rates, and each of said read-only memories being coupled to said source of signals (316, 318, and 320) for being one of enabled and disabled thereby, in such a manner that only one of said digital memories (314) is enabled at any one time;

a source (342) of ramp clock signals, which may be the same as said first clock signals;

controllable up-down counting means (340) including a clock input port (340*c*) coupled to said source of ramp clock signals, and also including an enable input port (340*e*) and a count direction input port (340*d*), for (a) generating and applying to said count-down means (312) said current count ratio signals, said current count ratio signals being representative of the current count of said up-down counting means (b) enabling said up-down counting means for counting said ramp clock signals in response to a second logic characteristic of a digital enable signals applied to said enable input port (340*e*), and disabling said up-down counting means in response to a first logic characteristic of said enable signals applied to said enable input port (340*e*), and (c) configuring said up-down counting means for counting up in response to a first logic characteristic of digital count direction signals applied to said count direction input port (340*d*);

comparator means (330) coupled to said read-only digital memories (314*a*–314*d*) and to said up-down counting means (340), for comparing said current count ratio signals with said digital count ratio signals, for (a) generating and coupling to said enable input port (340*e*) of said up-down counting means (340) said digital enable signals, said digital enable signals indicating by a first logic characteristic that said current count ratio signals equals said digital count ratio signals, and by a second logic characteristic that said current count ratio signals is unequal to said digital count ratio signals, and (b) generating and coupling to said count direction input port (340*d*) of said up-down counting means (340) said digital count direction signals, said digital count direction signals indicating by a first logic characteristic that said digital count ratio signals exceeds said current count ratio signals and by a second logic characteristic that said digital count ratio signals does not exceed said current count ratio signals;

whereby when said digital count ratio signals applied to said comparator means (330) represents a small number, indicative of a command for rapid rotation of said solar panel, and said current count ratio signals represent a larger number, indicative of slower actual rotation of said solar panel, said comparator means (a) generates said digital enable signals with said second logic characteristic, whereby said up-down counting means (340) is enabled for counting, and (b) generates said count direction signals with said second logic characteristic, for thereby configuring said up-down counting means for counting down, so that said current count ratio signals approach said digital count ratio signals, and said rate of rotation of said solar panel increases, and when said digital count ratio signals applied to said comparator means represent a large number, indicative of a command for slow rotation of said solar panel, and said current count ratio signals represent a smaller number, indicative of faster actual rotation of said solar panel, said comparator means (c) generates said digital enable signals with said second logic characteristic, whereby said up-down counting means is enabled for counting, and (d) generates said count direction signals with said first logic characteristic, for thereby configuring said up-down counting means for counting up, so that said current count ratio signals approach said digital count ratio signals, and said rate of rotation of said solar panel decreases, and when said current count ratio signals equals said digital count ratio signals, said digital enable signals are set to said first logic characteristic, thereby disabling said up-down counting means from counting, so that said rotational rate of said solar panel remains at the rate represented by said selected one of said digital count ratio signals.

2. A spacecraft according to claim 1, wherein said source of signals (316, 318, 320) representing a selected one of a predetermined number of solar panel rotational rates comprises:

one-of-many demultiplexing means (318) coupled to a source of digital signals (28, 320) representative of a selected one of a predetermined number of solar panel rotational rates, for decoding said digital signals, and for applying enabling signals to the selected one of said read-only digital memories (314*a*, 314*b*, 314*c*, 314*d*).

3. A spacecraft according to claim 1, wherein:

said source of signals representing a selected one of a predetermined number of solar panel rotational rates comprises one-of-many demultiplexing means (318) including a digital input port (318*i*), the less significant digits (S1, S2) of which are coupled to a source of digital signals (28, 320) representative of a selected one of a predetermined number of solar panel rotational rates, and a most significant digit (MSB of 318*i*) of which responds to direction change flag signals, for decoding said digital signals representative of a selected one of a predetermined number of solar panel rotational rates, and for applying enabling signals to the selected one of said read-only digital memories (314) when said direction change flag signals assumes a first logic characteristic;

said spacecraft further comprising:

direction flag signal generating means (350), for generating said direction change flag signals when the desired direction of rotation of said solar panel is reversed, and for maintaining said direction flag signals until said digital enable signals assume said first logic state;

digital read-only information storage means (360) coupled to said comparator means (330), said digital read-only information storage means (360) being preloaded with information in the form of a further digital count ratio signals corresponding to a solar panel rotational rate slower than any of the rotational rates associated with the information preloaded into said digital read-only memories (314a, 314b, 314c, and 314d), said digital read-only information storage means (360) including an enable input port responsive to a first logic characteristic of said direction change flag signals applied thereto; and coupling means (362) coupled to said direction flag signal generating means (350), to said enable input port of said digital read-only information storage means (360), and to said digital input port (318i) of said one-of-many demultiplexing means (318), for coupling said direction change flag signals to said one-of-many demultiplexing means (318) and to said digital read-only information storage means (360), for, in response to a command to change direction, causing said one-of-many demultiplexing means to disable said read-only digital memories, and for enabling said digital read-only information storage means, whereby said digital read-only information storage means produces said further digital count ratio signals corresponding to a solar panel rotational rate slower than any of the rotational rates associated with the information preloaded into said digital read-only memories, said comparator means causes said up-down counting means to count toward said further digital count ratio, said current count ratio signals approaches said further digital count ratio signals, and said comparator means causes said digital enable signals to assume said first logic state when said current count ratio signals equal said further digital count ratio signals, whereby said direction change flag signals generating means (350) ceases generation of said direction change flag signals, said digital read-only information storage means (360) is disabled, and said one-of-many demultiplexing means (318) enables one of said digital read-only memory means (314a, 314b, 314, or 314d).

* * * * *